United States Patent
Frank et al.

(10) Patent No.: US 7,203,773 B2
(45) Date of Patent: Apr. 10, 2007

(54) MULTI-PROTOCOL A/V CONTROL PORT WITH SELECTIVE MODULATION

(75) Inventors: Jef Frank, Fishers, IN (US); Dan Pierce, Brownsburg, IN (US); Gerard Talatinian, Indianapolis, IN (US)

(73) Assignee: Digital Networks North America, Inc., Santa Clara, CA (US)

( * ) Notice: Subject to any disclaimer, the term of this patent is extended or adjusted under 35 U.S.C. 154(b) by 398 days.

(21) Appl. No.: 10/656,048

(22) Filed: Sep. 4, 2003

(65) Prior Publication Data
US 2005/0055473 A1 Mar. 10, 2005

(51) Int. Cl.
*G06F 13/38* (2006.01)
*G06F 13/42* (2006.01)

(52) U.S. Cl. .............. 710/11; 710/8; 710/107

(58) Field of Classification Search .............. 710/8, 710/11, 33, 36, 52, 107, 200; 711/118, 170; 709/234
See application file for complete search history.

(56) References Cited

U.S. PATENT DOCUMENTS

| | | | | |
|---|---|---|---|---|
| 5,251,304 A | * | 10/1993 | Sibigtroth et al. ............ | 726/29 |
| 5,606,443 A | * | 2/1997 | Sgambati ..................... | 398/111 |
| 6,072,803 A | * | 6/2000 | Allmond et al. ............ | 370/445 |
| 6,370,550 B1 | * | 4/2002 | Douma et al. ........... | 715/500.1 |

* cited by examiner

*Primary Examiner*—Ilwoo Park
(74) *Attorney, Agent, or Firm*—McDonnell Boehnen Hulbert & Berghoff LLP

(57) ABSTRACT

A method and apparatus for using a control port in accordance with a variety of different protocols. A main processor communicates a configuration instruction to an interface controller. The interface controller uses the configuration instruction to select a protocol driver and to process signals to a control signal processor. The signals to the control signal processor include an output signal, an input signal, a direction signal, and a modulation enable signal. The control signal processor uses the direction signal to determine whether to output data or input data. The control signal processor uses the modulation enable signal to determine whether to couple a carrier signal on a transition from one digital level to another. The interface controller outputs data in accordance with a selected protocol and processes data input in accordance with the selected protocol.

16 Claims, 4 Drawing Sheets

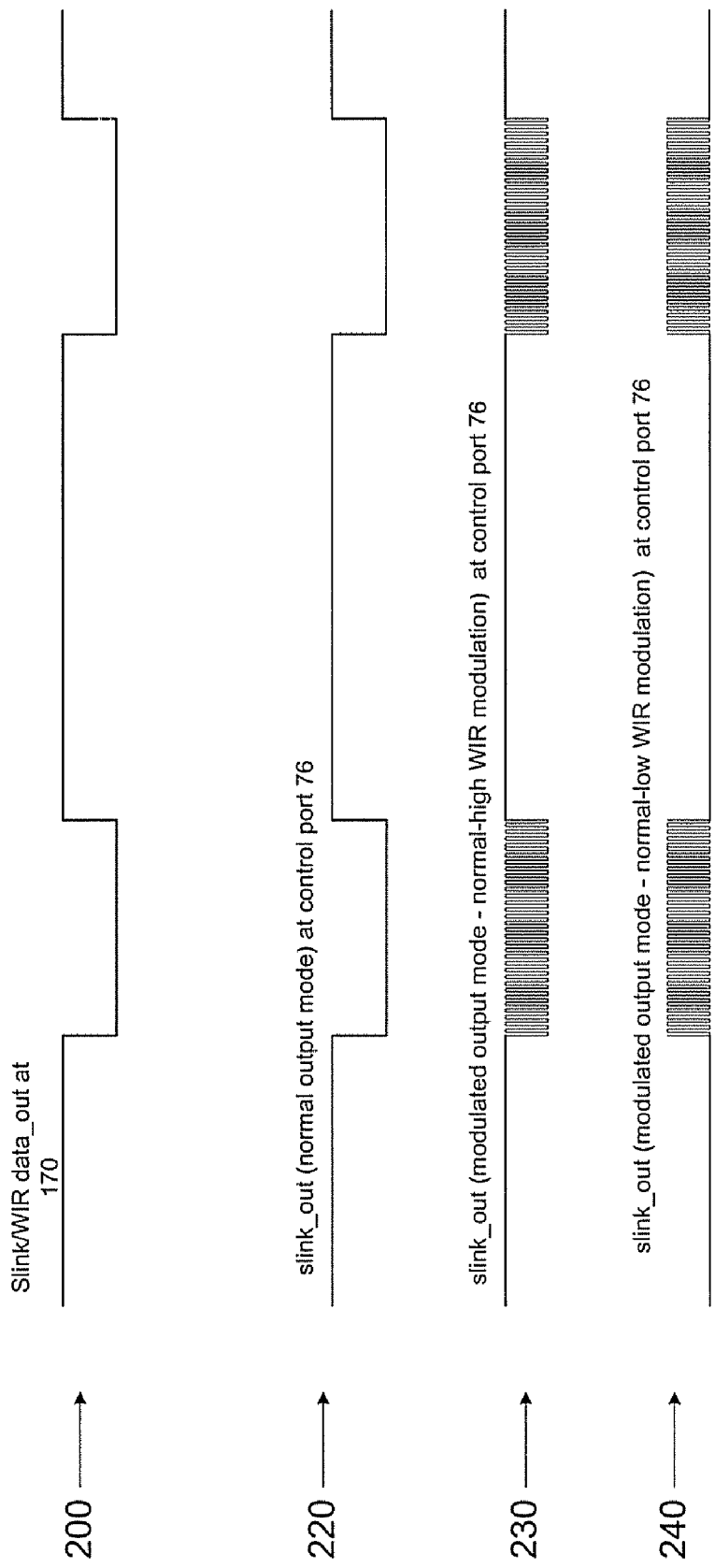

MULTI-PROTOCOL A/V CONTROL PORT WITH SELECTIVE MODULATION

COMPUTER PROGRAM LISTING APPENDIX

A compact disc (CD) deposited in the U.S. Patent and Trademark Office as an Appendix hereto contains computer program listings that are hereby incorporated-by-reference. The CD contains the following computer program listings, which have been prepared in the 'c' programming language and, which have been formatted as text files:

Coolingfanc.txt
Coolingfanh.txt
Demuxc.txt
Demuxh.txt
Ir_inputc.txt
Ir_inputh.txt
Ir_modulationc.txt
Ir_modulationh.txt
Kenwoodc.txt
Kenwoodh.txt
Linedriverfc.txt
Linedriverh.txt
Lowlatencyirc.txt
Lowlatencyirh .txt
Mainc.txt
Pioneerc.txt
Pioneerh.txt
Rs232c.txt
Rs232h.txt
Slinkc.txt
Slinkh.txt
Slipc.txt
Sliph.txt
Toolsh.txt
Twirpirc.txt
Twirpirh.txt
Versionh.txt Also included are two files: Makefile.txt and Atmel_mainapp.txt, which define how the 'c' files are built to create a software system. The "Atmel_mainapp.txt" file defines the system in memory and the "Makefile.txt" file is a linker script for mapping the system in memory. The system is preferably built using the AVR-GCC C compiler (and assembler) that is made available through the GNU project, although one of ordinary skill in the art would be able to use any suitable 'c' compiler. The system operates using the ATMEL brand Mega16 microprocessor, although one of ordinary skill in the art would be able to use other processors as well.

Also included on the CD are the following VHDL files:
Bidirbufw1.txt
Fmw000027_xx.txt
Irmodulator.txt
Slinkwirxr.txt
Tribuffw1.txt The VHDL files may be used to program an Altera EPM7032A CPLD (Complex Programmable Logic Device).

The computer program listings in the CD are subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

The current invention relates to entertainment devices and, more specifically, to systems and methods for configuring connections to media management systems.

BACKGROUND

Media management systems are becoming increasingly popular among consumers of entertainment media who need assistance in managing their ever-growing collections of CD's, DVD's, MP3 files and media-playing equipment. Media management systems interface with a variety of sources of media. For example, a media management system may receive media from different CD-changers, different DVD-changers, the Internet, a CD player, a DVD player, a personal computer and a hard disk drive. Media management systems also interface with a variety of media players. For example, the same media management system may play media on a monitor, a television, and on different media receivers. Media management systems are also typically able to display information about the media available on the connected sources of media on a user interface. The user interface allows the user to communicate instructions to play selected pieces of media.

Developers of media management systems aim to interface with as wide a variety of media sources as possible. Providing such variety however is complicated and expensive. Media sources use a wide variety of interfaces. To support different interfaces, media management systems must add different plugs or connectors to the device. Each connector added to the media management system increases the cost of the device. Each added connector also increases the likelihood of confusing the consumer by forcing the consumer to cope with still more connectors.

Connectors that provide remote control over the media source equipment connected to the media management system are particularly problematic. A media management system would advantageously be able to control and receive media from disc changers (CD or DVD changers) made by different manufacturers. Different manufacturers use different protocols and techniques for controlling their disc changers remotely. A SONY brand disc changer typically uses an S-Link interface to receive control signals from the media management system. A KENWOOD brand disc changer on the other hand may not have a S-Link interface and may therefore require an Infrared (IR) remote control interface via a direct wire or attached IR LED flasher commonly referred to as a DVD or CD control port. A PIONEER brand disc changer may use an IR remote control interface either direct wire or attached IR LED flasher, but it may use a different signal protocol than that of another manufacturer.

While the interfaces may be similar in that all use IR or protocols similar to IR protocols, the electrical differences are so great that there is insufficient overlap to use one connector for all. In order to support disc changers from different manufacturers, the media management system would have to provide a separate hardware interface for each type of device.

Based on the foregoing, a need exists for control interfaces that work with a variety of different media sources or other equipment that uses remote control capabilities.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanying drawings in which:

FIG. 4 shows signal formats for exemplary modulation schemes in accordance with exemplary embodiments.

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

1. Overview

Figure 1:
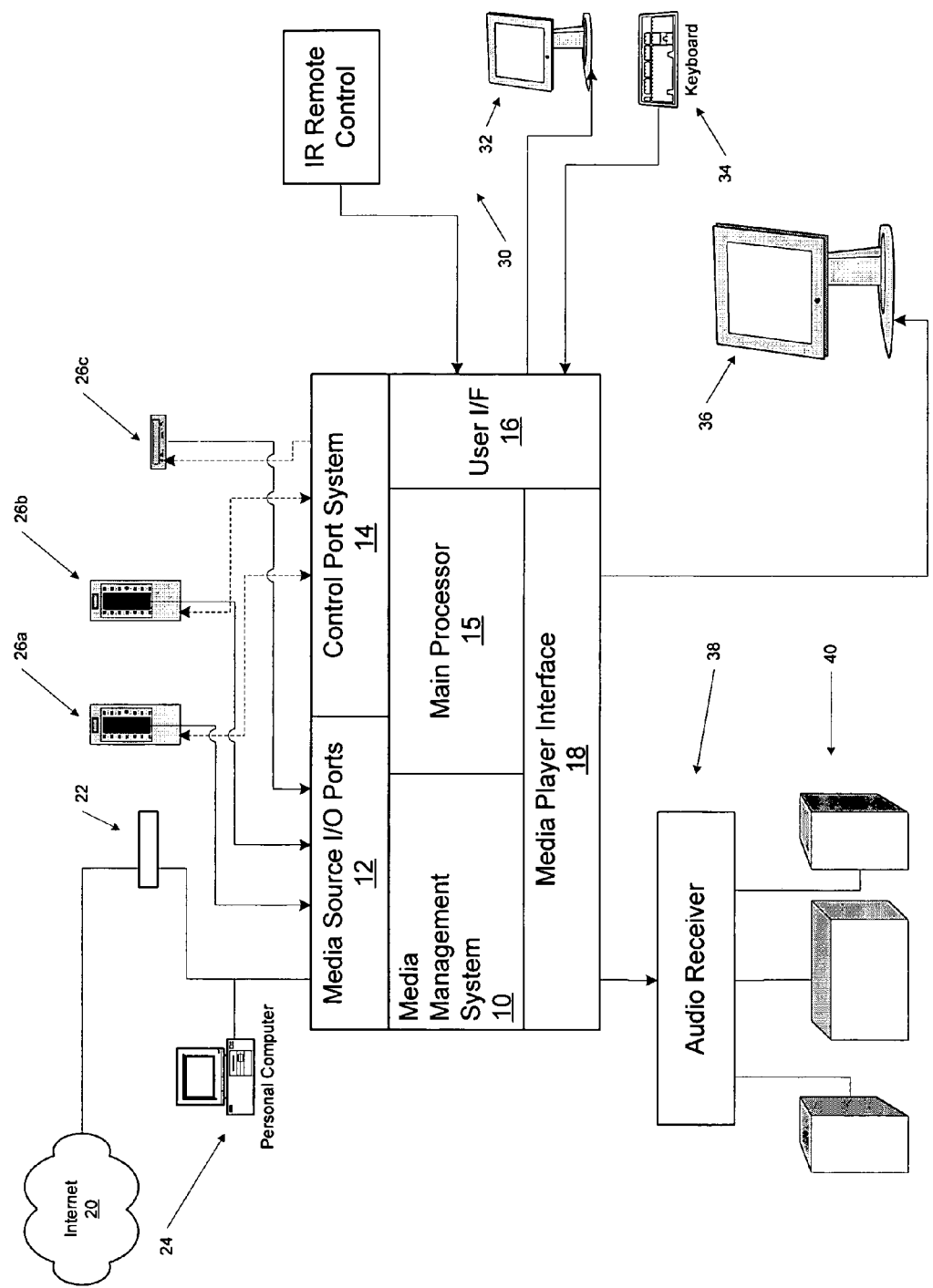
FIG. 1 is a block diagram illustrating an exemplary media management system.

FIG. 1 depicts operation of an exemplary media management system 10 comprising a plurality of media source input/output (I/O) ports 12 coupled to a plurality of media source devices or systems (e.g. Internet 20, personal computer 24, disc changers 26*a–c*). The media management system 10 accesses each media source and organizes information about the media that is accessible to the user of the media management system 10. The media management system 10 displays selected information about the media on a display 32. The media management system 10 also allows the user to configure and select media to play using a keyboard 34, an IR remote control 30 or another suitable input device. The media management system 10 comprises a media player interface 18 having a plurality of output ports coupled to a plurality of media players (e.g. audio receiver 38 having speakers 40, television 36). A user interface 16 processes user input and output via the display 32 and the keyboard 34 and provides configuration and execution processes to allow the user to manage and play the media obtained from the media sources.

The media source devices or systems shown in FIG. 1 are the Internet 20, a personal computer 24, and a first, second and third disc changers 26*a–c*. The Internet is preferably connected to a network hub 22, which provides Internet access to the personal computer 20 in a local area network environment. The personal computer 24 may connect to the media management system 10 using any suitable data connection (e.g. RS232, Ethernet, wireless Ethernet, etc.). In a preferred embodiment, the personal computer 20 connects to the media management system 10 at an Ethernet connection over which the media management system 10 connects to the Internet 20.

The first, second and third disc changers 26*a–c* may be any disc changer operable to hold a plurality of media discs such as audio CDs, Super Audio CD's (SACD), DVD's, etc. The disc changers 26*a–c* connect to the media management system 10 at the media source I/O ports 12 to communicate media to the media management system 10.

The disc changers 26*a–c* preferably have a remote control port to receive information that commands the disc changers to perform selected functions. Typically, the remote control port on typical disc changers 26*a–c* is an IR receiver operable to receive digital signals via a wireless or wired IR interface. The disc changers interpret commands from a pattern of digital signals received at the IR receiver. The digital signals are formed when the IR receiver receives an IR signal from an IR transmitter that turns the IR signal on and off at predetermined intervals. The digital signals conform to a signal protocol used by the disc changer to determine the information being communicated to the IR receiver. The signal protocol may vary in accordance with implementation requirements imposed by the manufacturer of the disc changer. Therefore each manufacturer may implement signal protocols that are specific for individual disc changers.

In a preferred embodiment, signal protocols may be determined and defined in a signal protocol driver by analyzing the control port signal and recording various signal characteristics while sending the IR commands to the IR receiver. The signal protocol driver may then contain information such as pulse widths indicative of a '0' or a '1.' The signal protocol driver may also contain commands or other information to which the patterns of '0s' and '1s' translate.

In alternative embodiments, the remote control port on the disc changer may be designed to communicate using a wired signal protocol. One example of a wired signal protocol is the S-Link protocol used on typical SONY brand audiovisual equipment. The S-Link protocol is bi-directional and communicates a serial digital pattern. The S-Link protocol may also comprise different flavors or variations that may be implemented by different equipment or by non-SONY brand equipment. For example, the S-Link protocol may be a control-S or a control-A protocol.

In an exemplary embodiment, the media management system 10 comprises a plurality of control ports managed by a control port system 14. Each control port has a serial interface that conforms to a selected one of the plurality of signal protocols that may be used by the disc changers. A serial connection between the control port and the IR receiver on the disc changer may be a wired IR connection, or a bi-directional connection that conforms with the S-Link communication protocol. The wired IR connection may be wired to interface with a wire that terminates at a wired IR receiver on the disc changer. The wired IR connection may also be wired to interface with a wire that terminates at an IR transmitter aimed at the IR receiver on the disc changer. In exemplary embodiments, the plurality of control ports may be configured to operate in accordance with any one of a selected wired IR protocol, or with an S-Link communication protocol.

The media management system 10 comprises a main processor 15 to receive a configuration instruction from the user over the user interface 15. The main processor 15 couples the configuration instruction to the control port system 14.

2. An Exemplary Embodiment of a Multi-purpose Control Port System

Figure 2:
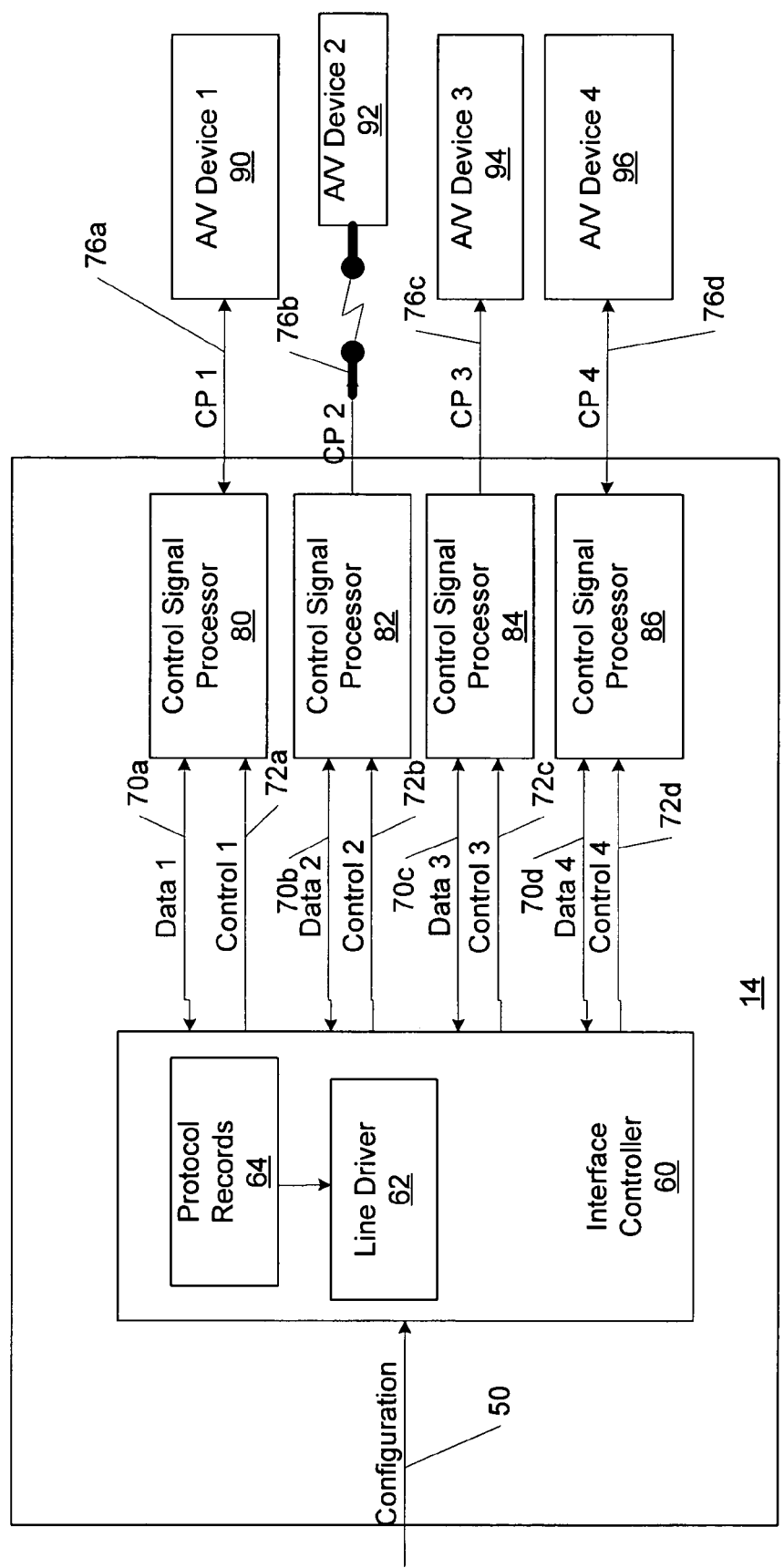
FIG. 2 is a block diagram illustrating an exemplary control port configuration system.

The system of FIG. 2 depicts operation of an exemplary control port system 14 that may be used in the system shown in FIG. 1. The control port system 14 in FIG. 2 comprises an interface controller 60, and a plurality of control signal processors 80–86.

In a preferred embodiment, the interface controller 60 comprises a microprocessor operable to communicate with the main processor 15 (in FIG. 1) over a bus system 50.

Alternatively, the interface controller 60 may be a function performed by the main processor 15. The bus system 50 may be any suitable bus system known in the art. Preferably, the bus system 50 communicates with the interface controller 60 via a Universal Asynchronous Receiver Transceiver (UART). A UART may be a configurable serial port on the main processor 15. The bus system 50 preferably communicates with the interface controller 60 using the RS 232, serial port interface (SPI) or I²C from North America Phillips, or even proprietary two and three wire protocols. In alternative embodiments, however, the bus system 50 is not a serial interface, but rather a parallel interface.

In a preferred embodiment, the interface controller 60 uses the AMTEL brand Mega16 microprocessor. Examples of computer programs that may be used with the interface controller 60 in a preferred embodiment are contained in a CD attached hereto as an Appendix. The computer programs performed by the interface controller 60 in the CD in the Appendix are programs written in the 'c' programming language.

The interface controller 60 comprises a line driver 62 and a plurality of protocol drivers 64. The line driver 62 inputs and outputs data on a plurality of data lines 70a–d corresponding to the control ports CP1–CP4 76a–d. The line driver 62 inputs and outputs the data by configuring and driving one of the control signal processors 80–86 corresponding with a selected one of the control ports 76a–d. The line driver 62 uses one of the protocol drivers 64 to configure the control signal processor 80 and to encode or decode commands sent to or received from an external device.

The external devices may include a first A/V device 90, a second A/V device 92, a third A/V device 94 and a fourth A/V device 96. The first A/V device 90 and fourth A/V device 96 comprise bi-directional control lines that interface with first and fourth control ports 76a and 76d, respectively. The first and fourth control ports 76a and 76d may be examples of ports conforming to the S-Link control protocol. The second A/V device 92 comprises a wireless IR control interface. The control port system 14 has a wire extended IR transmitter 76b that communicates IR signals based on the digital electrical signals output by the control signal processor 82. The third A/V device 94 has a wired IR interface that is an output of the control signal processor 84.

In an exemplary embodiment, the interface controller 60 receives a configuration instruction from the system bus 50 and configures the control signal processor 80–86 to operate in accordance with the a selected protocol driver 64. The configuration instruction specifies the selected protocol driver, which correlates with the type or brand of equipment connected at the control port 76a–d. For example, a KENWOOD brand CD changer may operate in accordance with a different signal protocol than a PIONEER brand CD changer. The plurality of protocol drivers 64 may therefore comprise a KENWOOD brand CD changer signal protocol and a PIONEER brand CD changer signal protocol.

In a preferred embodiment, the media management system 10 uses a configuration process to query the user for information regarding the equipment connected to the media source I/O ports 12. When the user identifies the brand of CD changer connected to one of the media source I/O ports 12, the main processor 15 may identify the corresponding protocol driver in the configuration instruction to the interface controller 60.

Alternatively, the media management system 10 may perform a self-discovery process. For example, a CD changer may couple signals that identify the CD changer as being of a particular type or brand when it is connected to control port 76a. The interface controller 60 may have the control port 76a in an unconfigured state before the CD changer is connected to the control port 76a. In the unconfigured state, the interface controller 60 may drive the control signal processor 80 to input data signals when the CD changer is connected to the control port. The data signals may be compared to predefined patterns that identify the brand or type of CD changer. The protocol driver corresponding to the identified CD changer would then be used to configure the control signal processor 80.

In another example of a self-discovery process, the interface controller 60 may float (or hold at a high or low digital level) the input line 170 and have the control signal processor 80 float (or hold at a high or low digital level) the control port 76 as an input line. The control signal processor 80 and the interface controller 60 may then detect any attempt to load the input control port line 76. An attempt to load the line may be sensed by detecting a signal attempting to pull the input control port line 76 in a direction opposite its digital high, low or floating level. Once an attempt to load the line is detected, the interface controller 60 may initiate a configuration process with the user, or exchange signals with an external device that is loading the input control port line 76.

The control signal processors 80–86 in FIG. 2 couple the data lines 70a–d from the interface controller 60 to the corresponding control port 76a–d in accordance with the control lines 72a–d from the interface controller 60. In a preferred embodiment, the control signal processors 80–86 comprise at least one complex programmable logic device (CPLD) although other programmable devices may be used as well. For example, the control signal processors 80–86 may be implemented as a separate part or integrated into a microcontroller or FPGA programmed in accordance with the logic required to drive the control ports 76a–d. Examples of computer programs that may be used to program an Altera EPM7032A CPLD in a preferred embodiment are attached as VHDL files in the CD attached hereto as an Appendix.

3. An Exemplary Control Signal Processor

Figure 3:
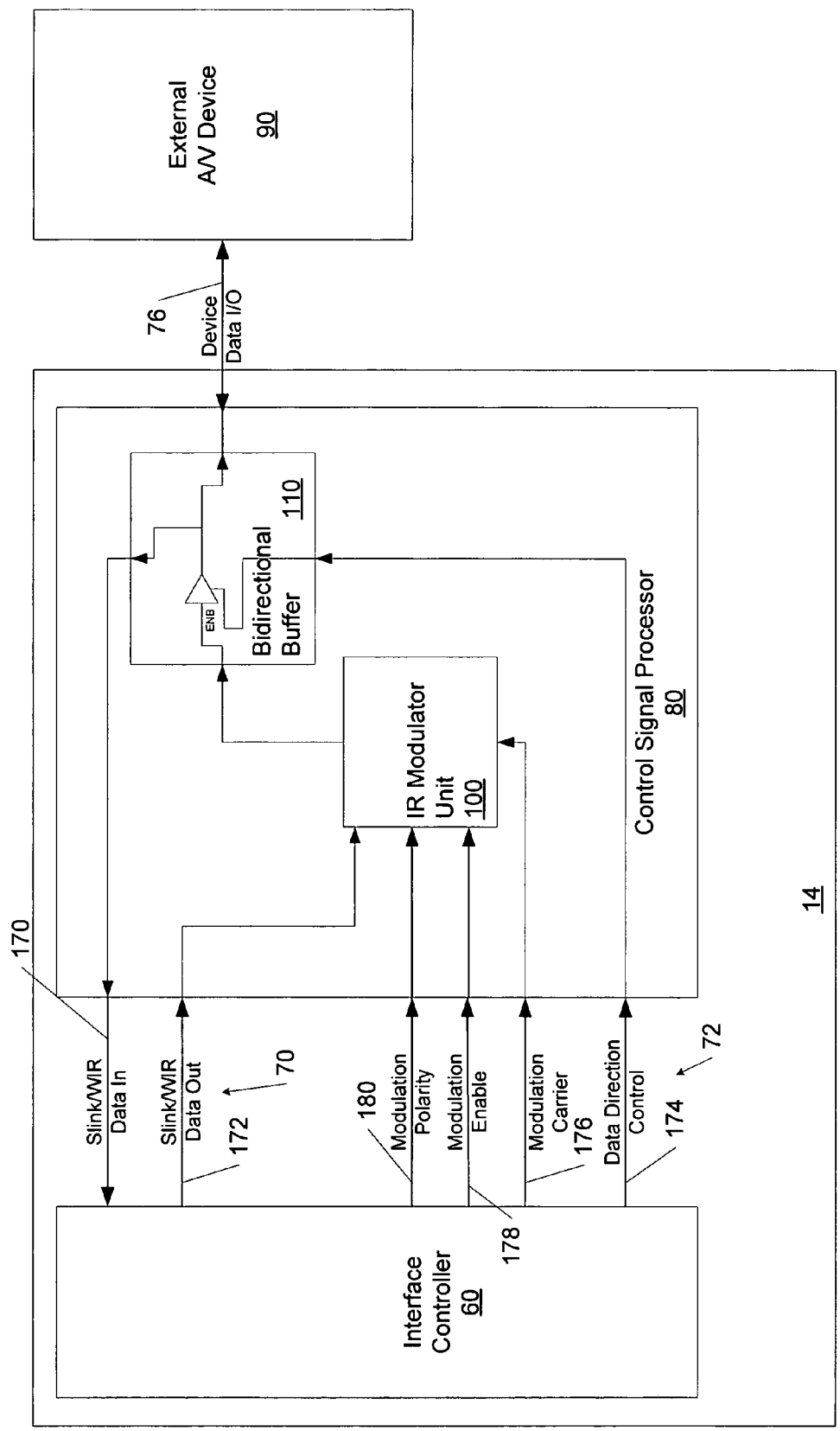
FIG. 3 is a block diagram illustrating an exemplary embodiment of an apparatus for configuring and using a control port from FIG. 2.

FIG. 3 depicts operation of an exemplary control signal processor 80 comprising an IR modulator unit 100 and a bidirectional buffer 110. The control signal processor 80 is coupled to the interface controller 60 with data lines 70 and control lines 72. The bidirectional buffer 110 couples directly to the control port 76.

The data lines 70 comprise a data input line 170 and a data output line 172. The interface controller 60 (preferably under the control of the line driver 62) drives the data output line 172 and samples the data input line 170. The data input line 170 and the data output line 172 are coupled to the bidirectional buffer 110. The bidirectional buffer 110 comprises a buffer enable signal having one state to enable the bidirectional buffer 110 to couple the data signal at the control port 76 to the data input line 170. The buffer enable signal may have a second state to enable the bidirectional buffer 110 to couple the data output line 172 to the control port 76.

The control lines 72 comprise a direction control line 174, a modulation carrier signal 176, a modulation enable line 178, and a modulation polarity line 180. The direction control line 180 is coupled to the buffer enable signal on the bidirectional buffer 110 to control the direction of the data signal at the control port 76. In a first state, the direction control line 174 enables the bidirectional buffer 110 to input a data signal at the control port 76 and in a second state, the direction control line 174 enables the bidirectional buffer 110 to output a data signal on the control port 76.

The modulation carrier signal 176, the modulation enable line 178 and the modulation polarity line 180 are coupled to the IR modulation unit 100 to modulate the signal output on the control port 76 in accordance with the selected protocol driver 64. In preferred embodiments, the output signal coupled to the control port 76 may be modulated to enable a receiving IR receiver to distinguish infrared light containing data from stray incident infrared light from other sources. Typical IR receivers may use an automatic gain control circuit coupled to a phase-locked loop circuit to sense the carrier signal and lock in on the signal in the appropriate state to re-create the original data signal.

The modulation unit 100 in FIG. 3 senses the modulation enable line 178 to enable modulation. If modulation is enabled, the modulation unit 100 senses the modulation polarity line 180 to invert the output signal when the carrier signal is not coupled to the control port 76. When the output signal is at a high digital level then, the output signal is coupled to the bidirectional buffer 110 to be output on the control port 76 directly. When the output signal transitions to a low digital level, the modulation unit 100 couples the modulation carrier signal 176 to the bidirectional buffer 110 to be output on the control port 76. When the output signal transitions back to the high digital level, the modulation unit 100 couples the output signal to the control port 76. If the modulation polarity line 180 is set to a normally high state, the output signal is coupled directly to the control port 76. If the modulation polarity line 180 is set to a normally low state, the output signal is inverted before being coupled to the control port 76.

FIG. 4 depicts examples of signals that are generated during exemplary operation of the modulation unit 100. An example of a data output signal 200 is shown in FIG. 4 to illustrate the output signal at the output data line 170. The data output signal 200 is output at the control port 76 as an unmodulated output control port signal 220 if the modulation enable line 178 is set to a disabled state. If the modulation enable line 178 is set to an enable state, the modulation carrier signal 176 is coupled to the control port 76 when the output signal at the output data line 170 transitions from its digital high state.

A first modulated signal 230 illustrates a modulated output signal when the modulation polarity 180 is set to normally high. As shown in FIG. 4, the first modulated signal 230 comprises a high level representative of the output data line 170 directly coupled to the control port 76. The normally high state of the modulation polarity line 180 signals the modulation unit 100 to output the output signal on the output data line 170 directly to the control port 76 as long as it is in the high state. When the output data line 170 transitions to a digital low level, the modulation unit 100 couples the modulation carrier signal to the control port 76.

A second modulated signal 240 illustrates a modulated output signal when the modulation polarity 180 is set to normally low. As shown in FIG. 4, the second modulated signal 240 comprises a low level representative of the inversion of the output data line 170 before being coupled to the control port 76. The normally low state of the modulation polarity line 180 signals the modulation unit 100 to invert the output signal on the output data line 170 before coupling it directly to the control port 76 as long as it is in the high state. When the output data line 170 transitions to a digital low level, the modulation unit 100 couples the modulation carrier signal to the control port 76.

4. Conclusion

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. An apparatus for using a control port to operate in accordance with multiple signal protocols comprising:

an interface controller comprising a line driver, a system interface and a plurality of protocol drivers each defining at least one signal characteristic, the system interface operable to receive a configuration instruction from a main processor and the line driver operable to communicate data on a data input line and a data output line, and control signals on a direction control line and a modulation control bus comprising a modulation polarity line, a modulation enable line, and a modulation carrier signal, in accordance with the configuration instruction; and a control signal processor connected to the control port and to the interface controller via the data input line, the data output line, the direction control line and the modulation control bus, the control signal processor comprising:

an infrared (IR) modulator unit operable to modulate the data output line in accordance with the modulation control bus;

an output function to couple the IR modulator unit data output line to the control port in accordance with a first direction state on the direction control line; and an input function to couple the control port to the data input line in accordance with a second direction state on the direction control line;

wherein the interface controller is operable to set the modulation polarity line to a state in accordance with the selected protocol driver and to set the modulation carrier signal to a frequency in accordance with the selected protocol driver.

2. The apparatus of claim 1 wherein the control signal processor comprises a bi-directional buffer having a buffer control line coupled to the direction control line and operable to enable the hi-directional buffer to communicate the data from the data output line to the control port when the direction control line is in the first direction state and to communicate the data from the control port to the data input line when the direction control line is in the second direction state.

3. The apparatus of claim 1 wherein the IR modulator unit modulates the data signal at the data output line by coupling a carrier signal to the control port when the data signal transitions from a first digital level to a second digital level if the modulation control enable line carried on the modulation control bus is in a modulation enable state.

4. The apparatus of claim 1 wherein the interface controller is operable to set the modulation polarity line to a normally high state or to a normally low state in accordance with the selected protocol driver.

5. The apparatus of claim 4 wherein the IR modulator unit modulates the data signal at the data output line by coupling the modulation carrier signal to the control port when the data signal transitions from a digital high level to a digital low level, and by coupling the data signal when the data signal transitions to a digital high level, the IR modulator unit being operable to invert the data signal from a digital high level before coupling the data signal to the control port if the modulation polarity line is in the normally low state.

6. The apparatus of claim 4 wherein the IR modulator unit modulates the data signal at the data output line by coupling the modulation carrier signal to the control port when the data signal transitions from a digital high level to a digital low level and by coupling the data signal to the control port when the data signal transitions to the digital high level if the modulation polarity line is in the normally high state.

7. The apparatus of claim 1 wherein the line driver is operable to drive at least one additional input line, at least one additional output line, at least one additional direction line and at least one additional modulation control bus, each at least additional output line, input line, direction line and modulation control bus being coupled to at least one additional corresponding control signal processor, each additional corresponding control signal processor coupled to a corresponding additional control port.

8. The apparatus of claim 1 wherein the plurality of protocol drivers comprises an S-Link protocol driver.

9. The apparatus of claim 1 wherein the plurality of protocol drivers comprises at least one wired infrared (IR) protocol driver defining corresponding wired IR protocols used by selected disc changers.

10. A method for using a control port to operate in accordance with multiple signal protocols comprising the steps of:
receiving a first configuration instruction from a main processor;
selecting a protocol driver from a plurality of protocol drivers corresponding to the multiple signal protocols in accordance with the first configuration instruction;
setting a modulation control bus to enable or disable modulation of an output signal in accordance with the configuration instruction, the modulation control bus comprising a modulation polarity line, a modulation enable line, and a modulation carrier signal;
receiving output data from the main processor;
setting a direction control line to an output direction state;
sending the output data to the control port by converting the output data to a serial output signal in accordance with the selected protocol driver;
setting the modulation control bus to enable modulation;
setting the modulation carrier signal to a frequency in accordance with the selected protocol driver; and
modulating the serial output signal via the modulation polarity line.

11. The method of claim 10 further comprising the steps of:
setting the direction control line to an input direction state; and
receiving a serial input signal and converting the serial input signal to input data in accordance with the selected protocol driver.

12. The method of claim 10 wherein the step of modulating the serial output signal comprises the steps of:
coupling the modulation carrier signal to the control port when the serial output signal transitions from a first digital level to a second digital level; and
coupling the serial output signal when the serial output signal transitions from the second digital level to the first digital level.

13. The method of claim 10 further comprising the step of:
setting the modulation polarity line to a normally high state in accordance with the configuration instruction, wherein the step of modulating the output signal comprises the steps of:
coupling the modulation carrier signal to the control port when the serial output signal transitions from a digital high level to a digital low level; and
coupling the serial output signal when the serial output signal transitions from the digital low level to the digital high level.

14. The method of claim 10 further comprising the step of:
setting the modulation polarity line to a normally low state in accordance with the configuration instruction, wherein the step of modulating the output signal comprises the steps of:
coupling a the modulation carrier signal to the control port when the serial output signal transitions from a digital high level to a digital low level;
coupling the serial output signal when the serial output signal transitions from the digital low level to the digital high level; and
inverting the serial output signal when the serial output signal is in the digital high level before coupling the serial output signal to the control port.

15. A media management system comprising:
a plurality of media source input/output (I/O) ports coupled to a plurality of media sources;
a media player interface comprising a plurality of output ports coupled to a plurality of media players;
a user interface coupled to at least one user interface device, the user interface operable to receive at least one configuration instruction from a user;
a control port system comprising at least one control port corresponding with at least one media source device coupled to at least one selected media source I/O port, the at least one media source device comprising a remote control input operable to receive control signals in accordance with a signal protocol, the at least one control port coupled to the remote control input, the control port system operable to configure the at least one control port to operate in accordance with one of a plurality of signal protocols, the control port system operable to select one of the plurality of signal protocols in accordance with the configuration instruction via an IR modulator unit;
a modulation polarity line capable of being set in a state in accordance with the selected protocol driver, the modulation polarity line being coupled to the IR modulator unit;
a modulation carrier signal capable of being set to a frequency in accordance with the selected protocol driver, the modulation carrier signal being coupled to the IR modulator unit; and
a media processor operable to receive the configuration instruction and to couple the configuration instruction to the control port system.

16. The apparatus of claim 1 wherein the plurality of protocol drivers comprises at least one wireless infrared (IR) protocol driver defining corresponding wireless IR protocols used by selected disc changers.

* * * * *